United States Patent [19]
Verhagen

[11] 3,737,774
[45] June 5, 1973

[54] AUTOMATIC LEVEL CONTROL DEVICE FOR USE IN TELECOMMUNICATION SYSTEMS

[75] Inventor: Jan Verhagen, Hilversum, Netherlands

[73] Assignee: U.S. Philips Corporation, New York, N.Y.

[22] Filed: Oct. 6, 1970

[21] Appl. No.: 78,381

[30] Foreign Application Priority Data

Oct. 13, 1969 Netherlands ........................6915475

[52] U.S. Cl. .........................325/2, 307/264, 323/66, 325/62
[51] Int. Cl. ...............................................H04b 3/04
[58] Field of Search........................325/62, 411, 413, 325/415; 179/170 T, 170 A, 1 VL; 178/70 TS; 323/66; 333/17, 81; 307/264; 330/26, 29, 86

[56] References Cited

UNITED STATES PATENTS

| | | | |
|---|---|---|---|
| 3,466,572 | 9/1969 | Hana et al. | 333/17 |
| 3,483,334 | 12/1969 | Hermes | 179/170 A |
| 2,825,867 | 3/1958 | Kabak | 323/66 |
| 3,452,268 | 6/1969 | Grossoehme | 323/66 X |

*Primary Examiner*—Benedict V. Safourek
*Attorney*—Frank R. Trifari

[57] ABSTRACT

Automatic level control device for use in telecommunication systems, said device comprising a level control member formed by a current-dependent impedance varying with the level control signal, said device comprising, in order to enable a very accurate adjustment of the level control signal, furthermore a variable current-independent impedance controlled by the level control signal, which together with the said current-dependent impedance forms part of a Wheatstone bridge formed by two parallel impedance circuits, of a variable direct-current source connected to said bridge and of a comparison device included in the galvanometer branch of the bridge, the output signal of said comparison device controlling the direct-current source.

6 Claims, 4 Drawing Figures

*INVENTOR.*

JAN VERHAGEN

*BY*

Frank R. Trifari

AGENT

Figure 1:
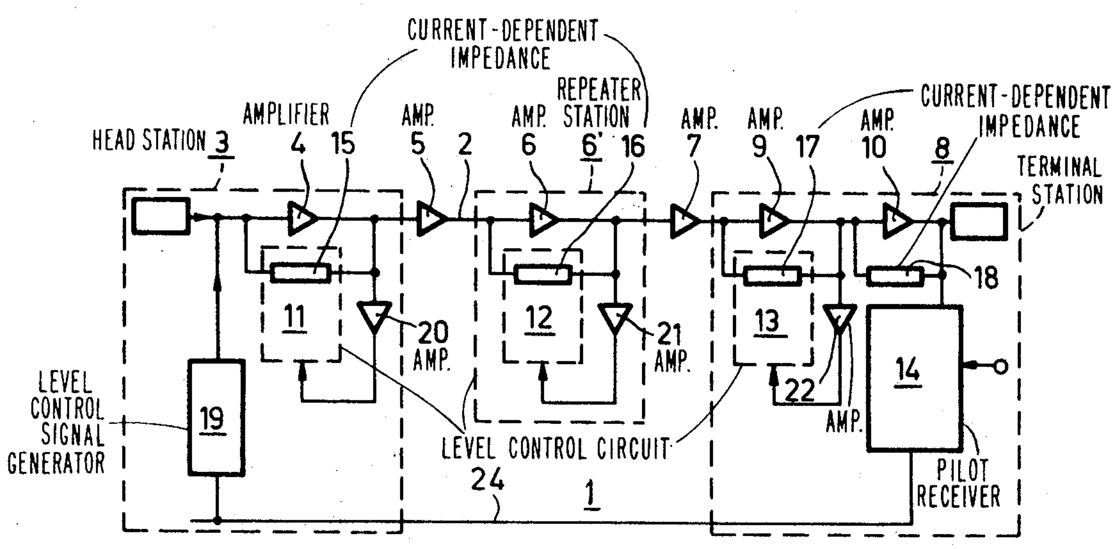

INVENTOR.
JAN VERHAGEN
BY
Frank R. Trifari
AGENT

AUTOMATIC LEVEL CONTROL DEVICE FOR USE IN TELECOMMUNICATION SYSTEMS

The invention relates to an automatic level control device for use in telecommunication systems, said device included in the transmission path comprising a level control member formed by a current-dependent impedance varying with a level control signal.

Level control devices of the kind set forth are known and involve in practice the difficulty that the level control member used therein has to satisfy a number of different requirements, which can be satisfied only partly by existing level control members such as incandescent lamps, thermistors, etc. In practice it is desirable, for example, for the level control member to have good high-frequency properties, whilst the low-frequency level control signal, for example, a direct voltage has to be capable of adjusting the member accurately. The control member should furthermore be small with a view to its accommodation in the transmission path.

The incandescent lamps used as level control members may, it is ture, be accurately adjusted to the correct impedance value, but at higher frequencies they are not satisfactorily operating due to the presence of parasitic reactances. Moreover, incandescent lamps have comparatively large dimensions. Other available level control members are small and have the desired satisfactory high-frequency properties, but they are not accurately adjustable to the correct impedance value because the adjusted value varies fairly drastically with the ambient temperature or because mutual tolerances are too high.

The aforesaid contradictory requirements, incompatible in the level control member, lead to compromises in the known level control devices or to the necessity of taking elaborate additional steps.

The corrected, has for its object to provide a level control device which under all operating conditions enables an accurate adjustment of the control member such that independently of the type of level control member employed compromises can be completely avoided.

According to the invention a level control device of the kind set forth is provided with a variable, current-independent impedance controlled by the level control signal and forming, together with said current-dependent impedance, part of a Wheatstone bridge constituted by two parallel impedance circuits. A direct-current source is connected to said bridge and a comparison device included in the galvanometer branch of said bridge. The output signal of said comparison device controls the direct-current source so that the current passing through the bridge compels the current-dependent impedance to assume a value such that a given, fixed relation between the impedance value of said current-dependent impedance and the impedance value of said current-independent impedance is maintained throughout the control-range.

When the steps in accordance with the invention are carried into effect, the requirements to be satisfied initially by a single level control impedance with respect to accurate adjustability and suitability at high frequencies are now split up to be satisfied by two impedances, i.e. the variable current-independent impedance need only be accurately adjustable and the current-dependent level control impedance need only be suitable for high frequencies.

If desired, said current-dependent impedance and said variable current-independent impedance may be included in series in one and the same impedance circuit of the bridge, the automatic balancing effect of the bridge ensuring that the sum of these series-connected impedances remains constant.

In a practical embodiment, which has been subjected to elaborate experiments and which appears to satisfy very severe requirements of accuracy,,said current-dependent impedance is, however, included in one circuit and said variable current-independent impedance is included in the other circuit of the parallel impedance circuits of said bridge. The self balancing property of the bridge in that case compels the value of said current-dependent impedance to follow the value of the current-independent impedance throughout the level control-range, in a given fixed ratio.

Figure 2:
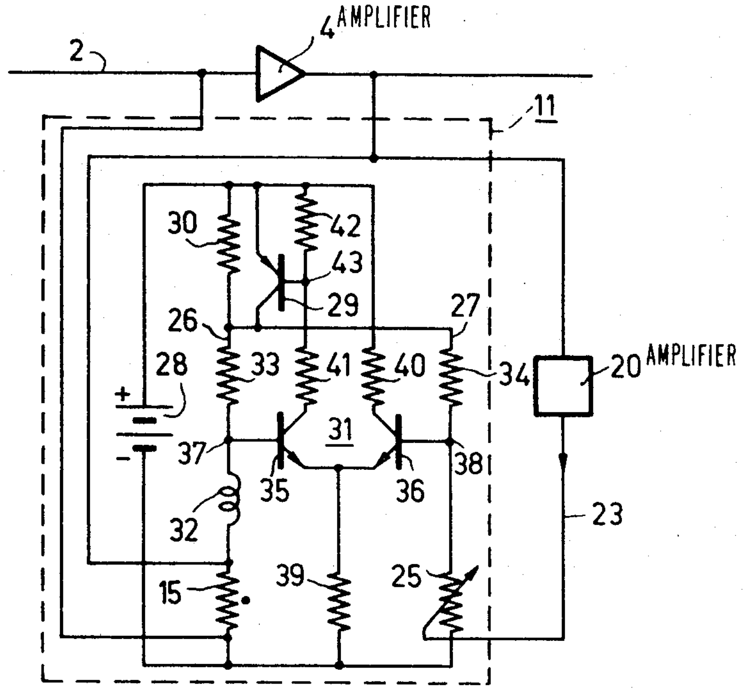

The ivnetnion and its advantages will be described more fully with reference to the Figures, which show in FIG. 1 schematically a telecommunication system in which the level control device in accordance with the invention can be employed advantageously, in FIG. 2 the level control device embodying the invention in greater detail, in FIGS. 3 and 4 possible embodiments of a variable current-independent impedance advantageously used in the level control device of FIG. 2.

FIG. 1 shows a carrier frequency telephone system 1 for signal transmission along a coaxial line 2, in which, for example, several thousand speech signals in a frequency band of 12 MHz or more, a television signal and the like are transmitted through the line 2. In the system shown the carrier-frequency telephone signals from a carrier-frequency telephone head station 3 comprising a head amplifier 4 are transmitted via intermediate amplifiers 5, 6, 7 to a carrier-frequency terminal station 8 comprising a pre-amplifier 9 and an output amplifier 10.

For the compensation of level variations in the transmitted signals, which variations are mainly due to attenuation variations as a result of temperature fluctuations in the coaxial line 2, the head amplifier 4 in the carrier-frequency telephone head station 3, the intermediate amplifier 6 in the repeater-station 6′ and the pre-amplifier 9 and the output amplifier 10 in the carrier-frequency telephone terminal station 8 are each provided with a level control device 11, 12, 13 and 14 respectively. Each of these level control devices comprises a current-dependent impedance 15, 16, 17, 18 in the form of a thermistor included in the negative feedback circuits of the associated controlled amplifiers 4, 6, 9, 10 respectively. The intermediate amplifiers 5 and 7 have no level control.

As described in prior U.S. Pat. No. 3,456,191, the level control of the amplifiers 4, 6 and 9 is performed using a level control signal of given frequency, produced by a level control-signal generator 19 in the head station 3, which is frequency-controlled in a frequency band from 35 to 42 kHz and applied via the coaxial line 2 and the frequency-selective amplifiers 20, 21 and 22 to the respective level control devices 11, 12 and 13. The level control is advantageously carried out in the manner disclosed in prior U.S. Pat. No. 3,414,688, that is to say so that in the output signal of the amplifiers 4, 6 preceding the terminal station 8 a level deviation is produced with a polarity opposite to the level deviation at the terminal station 8, whilst the output signal of the terminal station 8 is brought to the nominal level by the level control of the pre-amplifier 9 and the output amplifier 10.

For the level control of the output amplifier 10 a pilot signal is transmitted along the coaxial line 2 together with the carrier-frequency telephone signals, said pilot signal being applied to a pilot receiver 14 forming part of the terminal station 8. Since this pilot receiver is described in detail in said prior U.S. Pat. No. 3,345,191, it may suffice to note that this pilot receiver provides a level control signal determined by level difference by level comparison of the pilot signal brought approximately to nominal level by the pre-amplifier 9 with a fixed reference level, said signal controlling the level control impedance 18 in the negative feedback circuit of the output amplifier 10 for accurate level control. As long as the level control of the output amplifier 10 is capable of compensating the level deviation detected by the pilot receiver 14 the level control of the amplifiers 4, 6, 9 need not be correct so that it is not necessary to vary the frequency of the level control signal produced by the variable level control-signal generator 19. As soon as the level deviation detected by the pilot receiver 14 becomes so high that it can no longer be compensated by the level control of the output amplifier 10, the level control of the amplifiers 4, 6 and 9 has to be corrected. For this purpose the pilot receiver is provided with a marginal monitoring device (not shown), which ensures that, when the detected level deviation exceeds the control-range of the controlled output amplifier 10, a series of instruction pulses is applied via the instruction line 24 to the level control-signal generator 19. The latter is constructed so that it changes, on the basis of the instruction pulses, the frequency of the level control signal applied to the level control devices 11, 12 and 13 in a sense such that the level deviation again lies within the control-range of the amplifier 10. The level control of the communication system described is thus performed as a whole from the pilot receiver 14; for the level control of the output amplifier 10 an output signal of the pilot receiver is used directly for the adjustment of the level control impedance 18 of the output amplifier 10, whereas for the level control of the amplifiers 4, 6, 9 the pilot receiver supplies instruction pulses which perform the adjustment of the level control signal so that the identical level control devices 11, 12, 13 of the amplifiers 4, 6, 9 are controlled in common.

In view of the stringent requirement applying in general to carrier-frequency telephone systems permitting level variations of the signal in the carrier-frequency terminal station of, for example max. 3dB, which requirement also applies to the intermediate amplifying stations, it will be obvious that the adjustment of the level control impedance in these repeater stations has to be particularly accurate and identical and that a level control device enabling a simple adjustment of the level control member, which is accurate under all operating conditions is not only advantageous but also provides a material improvement in the whole carrier-frequency telephone system in which these devices are used.

In the carrier-frequency telephone system shown in FIG. 1 the above applies to the level control devices 11, 12, 13, which are constructed along new lines. Since these level control devices are identical, a description of the level control device 11 may suffice. It is shown in detail in FIG. 2, in which parts corresponding with those of FIG. 1 are designated by the same reference numerals.

According to the invention this level control device comprises a variable, current-independent impedance 25 controlled by the level control signal and forming together with said current-dependent impedance 15 part of a Wheatstone bridge constituted by two parallel impedance circuits 26, 27, a direct-current source 28, 29, 30 connected to said bridge and a comparison device 31 included in the galvanometer branch of said bridge, output signal of said comparison device controlling the direct current source 28, 29, 30 so that the current passing though the bridge compels the current-dependent impedance 15 to assume a value such that a given fixed relation between the value of siad current-dependent impedance 15 and the value of said current-independent impedance 25, controlled by the level control signal, is maintained throughout the control-range.

In the embodiment shown the current-dependent impedance 15 is included in one circuit 26 and the variable current-independent impedance 25 is included in the other circuit 27 of said bridge. The current-dependent impedance 15 is formed by a directly heated thermistor. Apart from said thermistor the impedance circuit 26 includes a series coil 32 and a series resistor 33. The coil 32 is formed by a choke suppressing the alternating-current signals of the amplifier 4, it being assumed for the sake of simplicity that this coil has no direct-current resistance.

The current-independent impedance 25 in this embodiment is not a resistor in the common sense, but it is formed by a network which, like a resistor, has a linear relation for direct current and direct voltage as will be explained more fully hereinafter. Apart from this current-independent impedance 25 the parallel impedance circuit 27 includes a series resistor 34. The direct current passing through the bridge is controlled by a transistor 29 and a parallel resistor 30.

The comparison device 31 in this embodiment is formed by a differential amplifier comprising two transistors 35, 36 the bases of which are connected to junctions 37 and 38 respectively of the bridge and which are furthermore provided with a common emitter resistor 39 and collector resistors 40 and 41, 42 respectively. This comparison device controls the transistor 29, the base of which is connected to the junction 43 of the resistors 41 and 42.

The level control device described operates as follows: Assuming the resistors 33 and 34 to be equal to one another, the junctions 37 and 38 of the bridge do not exhibit a potential difference, provided also the resistance of thermistor 15 and the resistance of variable impedance 25 are likewise equal to each other. As soon as a difference between these resistances appears, for example, because the variable impedance 25 is adjusted to a different value by the level control signal applied via the line 23 or because the resistance value of the thermistor 15 changes, for example, by a change in ambient temperature, a potential difference appears between the junctions 37 and 38 of the bridge. The comparison device 31 connected to said junctions then produces a change of the collector current of the transistor 29 and hence of the current passing through the two branches 26, 27 of the bridge. This current variaton does not affect the impedance value of the variable impedance 25, since this impedance value does not depend upon current. The resistance value of thermistor 15 is, however, affected by said current variation in a sense such that the value becomes equal to the value of the variable impedance 25. The potential difference between the junctions 37 and 38 of the bridge is then zero so that the bridge automatically gets into its state of equilibrium. It should be noted that this self-balancing effect is not based on the comparison of voltages, but on the comparison of impedance values, that is to say, on voltage current ratios, so that the control is insensitive to any variations of the direct-current supply source.

The level control device therefore has the important advantage that a very accurate adjustment of the thermistor impedance can be obtained without the need for stabilizing measures.

The value of the current-dependent impedance 15 in the embodiment shown is compelled to follow in a given fixed ratio the current-independent impedance 25, varying with the level control signal, throughout the control-range. This ratio, in accordance with the condition of equilibrium of the bridge, is given by the ratio between the resistors 33 and 34, which means that by rendering one resistor or both resistors 33, 34 adjustable the said ratio can be adjusted at will.

Therefore, apart from said advantage of the accurate adjustability of the thermistor impedance without stabilizing steps the device embodying the invention has the additional advantage that the ratio between the thermistor impedance and the impedance controlled by the level control signal can be adjusted in a simple manner, which is particularly important in practice for accurate individual adaptation to the distance per section, for example, if the distance between the controlled amplifiers differ from each other.

The level control signal is preferably formed by a time-modulated signal, for example, a pulse-duration-modulated signal or, as in FIG. 1, a frequency-varying signal. This has the advantage that the desired adjustment of the variable impedance as characterized by the time modulation cannot be affected by attenuation variations in the transmission path.

Figure 3:
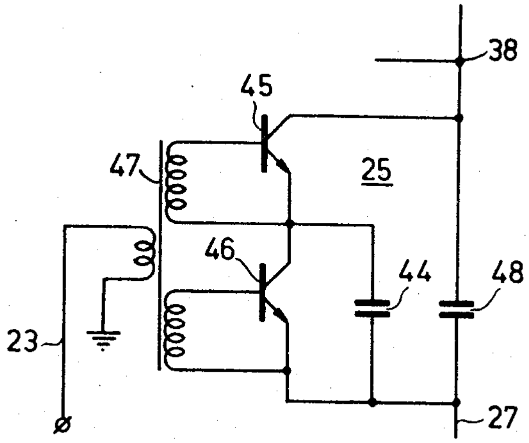

When the level control signal is formed by a frequency-varying signal, it is advantageous to use a network of the kind shown in FIG. 3 to form the variable impedance 25 to be adjusted thereby. This network comprises a comparatively small capacitor 44, to which a charging circuit formed by a transistor 45 and a discharging circuit formed by a transistor 46 are connected, said circuits being controlled via a transformer 47 by the frequency-varying level control signal. In the network shown the transistor 45 is rendered conducting during every half period of the level control signal applied to the transformer input so that the capacitor 44 is charged to a voltage E by a charging current derived from a capacitor 48 of comparatively high capacitance value, said capacitor discharging during the subsequent half period across the then conducting transistor 46. If the frequency of the level control signal applied to the transformer input is, for example, $f$ and if the capacitance of capacitor 44 is C, this capacitor takes a charge of CE in each period of the level control signal so that the capacitor 48 supplies a current I of the value:

$$I = f\,CE \quad (1)$$

since the current is equal to the quantity of charge taken per unit time.

The network described may be considered to be a resistance determined by the ratio $E/I$, the value varying with the frequency of the level control signal; from formula (1) it follows that:

$$R = E/I = 1/fC \quad (2)$$

Figure 4:
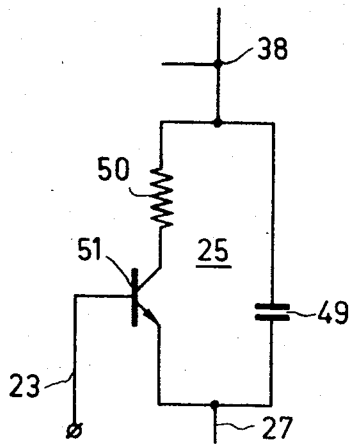

If the level control signal is formed by a pulse-duration-modulated signal, it is advantageous to use a network of the kind shown in FIG. 4 for the variable impedance 25 to be adjusted thereby. This network comprises a comparatively large capacitor 49 and a capacitor discharging circuit formed by a resistor 50 connected in series with a transistor 51. The discharging circuit is controlled by the pulse-duration-modulated level control signal, which is applied to the base of transistor 51. In the network shown the transistor 51 is rendered periodically conducting for the duration of the pulse-duration-modulated pulses applied thereto so that the capacitor 49 is partly discharged. If the pulse-repetition frequency of the pulse-duration-modulated level control signal is $f = 1/T$ and if the value of the series resistor is equal to $R_s$, the discharge current is $$I = E\cdot(t/T/R_s) \quad (3)$$

wherein $E$ is the capacitor voltage and $t$ is the pulse duration. For direct current this network may be considered to form a resistor the value of which varies with the pulse duration of the pulse-duration modulated pulses of the level control signal; from (3) it follows that $$R = E/I = (R_s\cdot T/t)$$

Since in the level control device described the level control impedance accurately follows the value of the variable current independent impedance adjusted by the level control signal, this level control device can be universally employed for substantially any type of level control impedance, for example, of the directly controlled type, for example, the incandescent lamp, the thermistor, the VDR, the PTC-resistor or of the indirectly controlled type, for example, the NTC-resistor and field-effect transistors. It will be obvious that in the case of an indirectly controlled level control impedance the current supplied to the bridge has to pass in addition through the control element, for example, in the case of an indirectly heated thermistor the filament wire.

It should finally be noted that the level control device in accordance with the invention is not restricted to its use in a carrier-frequency telephone system of the kind shown in FIG. 1, in which a plurality of cascade-connected level control devices are controlled in common by a single level control signal. The use of said level control device is, however, particularly advantageous in such systems because under any condition an accurately identical adjustment of the level control impedances can be achieved, also because there is no need for stabilization.

What is claimed is:

1. A circuit comprising a repeater station adapted to be controlled by a control signal, said station comprising an amplifier having an input and an output, a wheatstone bridge circuit comprising a current independent controllable first impedance means coupled to receive a signal varying with said control signal and having an impedance varying with said control signal, a second impedance means coupled to said first impedance means, a third impedance means coupled to said second impedance means, and a current dependent fourth impedance means coupled to said third impedance means and to said amplifier input and output, means coupled to said bridge for detecting unbalence therein; and means coupled to said detecting means for supplying a current to said current dependent impedance to vary the impedance thereof to restore said bridge to balance, whereby said current dependent impedance controls the feedback about said amplifier and hence the effective gain thereof in accordance with said control signal.

2. A circuit as claimed in claim 1 wherein one of said third and fourth impedance means comprises an adjustable impedance means, whereby the relationship between changes in said current dependent and independent impedance means can be adjusted.

3. A circuit as claimed in claim 1 wherein said repeater station is adapted to be controlled by a time modulated signal.

4. A circuit as claimed in claim 1 wherein said current independent impedance means comprises a capacitor, means for charging said capacitor, and means for discharging said capacitor, said charging and discharging means being adapted to receive a frequency modulated control signal.

5. A circuit as claimed in claim 1 wherein said current independent impedance means comprises a resistor and a transistor having emitter and collector electrodes series coupled to said resistor and a base electrode adapted to receive a pulse duration modulated control signal.

6. A circuit comprising a plurality of cascade coupled repeater stations as claimed in claim 1, the gain of each of said stations being controlled by the same control signal.

* * * * *